Patented Apr. 8, 1952

2,592,034

UNITED STATES PATENT OFFICE 2,592,034

COLD-SETTING RESINOUS CEMENTS

Francis Robert Himsworth and Harry Hughes, Norton-on-Tees, England, assignors to Imperial Chemical Industries Limited, a corporation of Great Britain No Drawing. Application May 5, 1950, Serial No. 160,382. In Great Britain May 9, 1949

7 Claims. (Cl. 260—30.4)

This invention relates to cold-setting cements based on phenol formaldehyde resins and has for its object to render such cements substantially resistant not only to acids (which they inherently are), but also to caustic alkalis.

In this specification the term "cold setting cements" is intended to mean a cement that can be made to settle down from a syrupy state to a hard condition in the cold, by means of an acid accelerator.

Attempts have been made for some time to find substances which, when added to cold-setting phenol formaldehyde resinous cements, will impart to the latter substantial resistance to caustic alkalis, and the following substances have been suggested for this purpose: ethylene chloride, chlorohydrins, including epichlorohydrin, and especially di-chlorohydrin, o-chlorobenzaldehyde, trimethyl phosphate, tri-ethyl phosphate, 1,4-dimethyl 2,5-chloromethyl benzene.

Now these substances suffer from various disadvantages, notably unpleasant smell and toxicity; furthermore, they are not readily available.

We have now found that the aliphatic esters of furfuryl alcohol and of tertrahydrofurfuryl alcohol are effective in rendering cold setting phenol formaldehyde resinous cements resistant to caustic alkalis.

According to the invention, therefore, provision is made for the presence of one or more aliphatic esters of furfuryl alcohol and/or of tetrahydrofurfuryl alcohol in a cold-setting phenol formaldehyde resinous cement in a total amount at least sufficient to render this cement substantially resistant to caustic alkalis.

Aliphatic esters of furfuryl alcohol and tetrahydrofurfuryl alcohol are free from toxicity or unpleasant smell.

It is known that the resin, in order that the cement be capable of being effectively stabilised against caustic alkali attack, should in general contain formaldehyde and phenol in a molar ratio of at least 1.5:1. We prefer a molar ratio of about 1.75:1. Raising the molar ratio above this value, say, up to 2:1, was found to have only a minor effect on the efficiency of the additive applied in accordance with the invention.

Of the additives that can be used according to this invention, esters with up to 4 carbon atoms in the aliphatic chain are preferred; tetrahydrofurfuryl acetate was found to be particularly effective and is therefore more particularly preferred.

In addition to the advantages mentioned, tetrahydrofurfuryl acetate has the further advantages that it is easily manufactured and that it gives cements which show better resistance towards some organic solvents, e. g., certain alcohols, amines and aldehydes than if certain other additives, e. g., di-chlorohydrin are used.

Two examples will not be given of the way the invention may be carried into effect.

Example 1

65 parts by weight of a phenol formaldehyde resin made from 1.75 mol of formaldehyde per mol of phenol were mixed with 35 parts by weight of tetrahydrofurfuryl acetate and with 30 parts by weight of para-toluene sulphonyl chloride as an acid accelerator for the purpose of ensuring cold setting. An inert filler was added to give a suitable trowelling consistency. After the mixture had been allowed to set at ordinary temperature for about 7 days, it was found to be resistant to caustic alkali, as shown by the following test: the cement was immersed in a cold 5% caustic soda solution and left there for 3 months. After this period its crushing strength was found to be reduced by not more than approximately 30%.

A cement in which dichlorhydrin was used as additive showed a similar reduction in strength under the same conditions whilst a cement prepared from the resin without any additives other than the paratoluene sulphonyl chloride and inert filler was completely disintegrated by cold 5% caustic soda solution after a few hours.

Example 2

70 parts by weight of a resin as in Example 1 were mixed with 30 parts by weight of furfuryl acetate and 30 parts by weight of para-toluene sulphonyl chloride, an inert filler being added as in Example 1. The cement, after setting, was found to be resistant to caustic soda in moderate concentrations.

In the case of either of the two additives for raising the alkali resistance mentioned in the foregoing examples it was found that quantities by weight up to the weight of resin used may be added without adversely affecting the setting properties of the cement, but that higher quantities should preferably not be used, as they will interfere with said setting properties.

We claim:

1. A cold-setting phenol formaldehyde resinous cement containing at least one aliphatic ester of a member of the group consisting of furfuryl alcohol and tetrahydrofurfuryl alcohol having up to four carbon atoms in the aliphatic chain and being present in a total amount at least sufficient to render said cement substantially resistant to caustic alkalis.

2. A cold-setting phenol formaldehyde resinous cement containing tetrahydrofurfuryl acetate in an amount at least sufficient to render said cement substantially resistant to caustic alkalis.

3. A cold-setting phenol formaldehyde resinous cement made from formaldehyde and phenol in a molar ratio of at least 1.5:1 and at least one aliphatic ester of a member of the group consisting of furfuryl alcohol and tetrahydrofurfuryl alcohol having up to 4 carbon atoms in the aliphatic chain and being present in a total amount at least sufficient to render said cement substantially resistant to caustic alkali.

4. A cold-setting phenol formaldehyde resinous cement made from formaldehyde and phenol in a molar ratio substantially equal to 1.75:1 and at least one aliphatic ester of a member of the group consisting of furfuryl alcohol and tetrahydrofurfuryl alcohol having up to 4 carbon atoms in the aliphatic chain and being present in a total amount at least sufficient to render said cement substantially resistant to caustic alkali.

5. A cold-setting phenol formaldehyde resinous cement comprising substantially 65 parts by weight of a phenol formaldehyde resin made from substantially 1.75 mols of formaldehyde per mol of phenol, substantially 30 parts by weight of para-toluene sulphonyl chloride, substantially 35 parts by weight of tetrahydrofurfuryl acetate and, in addition, an inert filler.

6. A cold-setting phenol formaldehyde resinous cement comprising substantially 70 parts by weight of a phenol formaldehyde resin made from substantially 1.75 mols of formaldehyde per mol of phenol, substantially 30 parts by weight of para-toluene sulphonyl chloride, substantially 30 parts by weight of furfuryl acetate and, in addition, an inert filler.

7. A cold-setting phenol formaldehyde resinous cement of improved resistance to caustic alkali containing at least 1 aliphatic ester of a member of the group consisting of furfuryl alcohol and tetrahydrofurfuryl alcohol having up to 4 carbon atoms in the aliphatic chain.

FRANCIS ROBERT HIMSWORTH.
HARRY HUGHES.

REFERENCES CITED

The following references are of record in the file of this patent:

UNITED STATES PATENTS

| Number | Name | Date |
|---|---|---|
| 1,978,710 | Jaeger | Oct. 30, 1934 |